March 3, 1970  J. MARGULIES  3,497,985
FISH LURES
Filed April 22, 1968  2 Sheets-Sheet 2
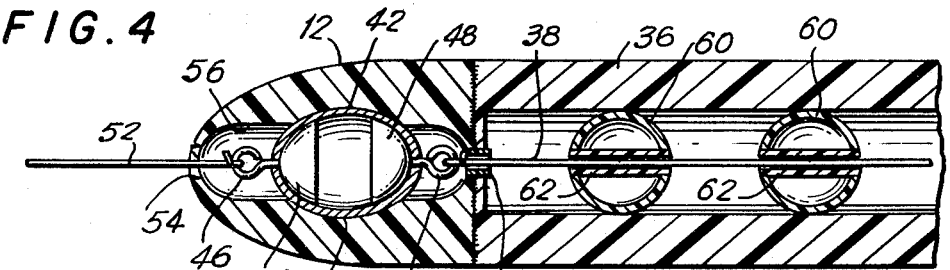
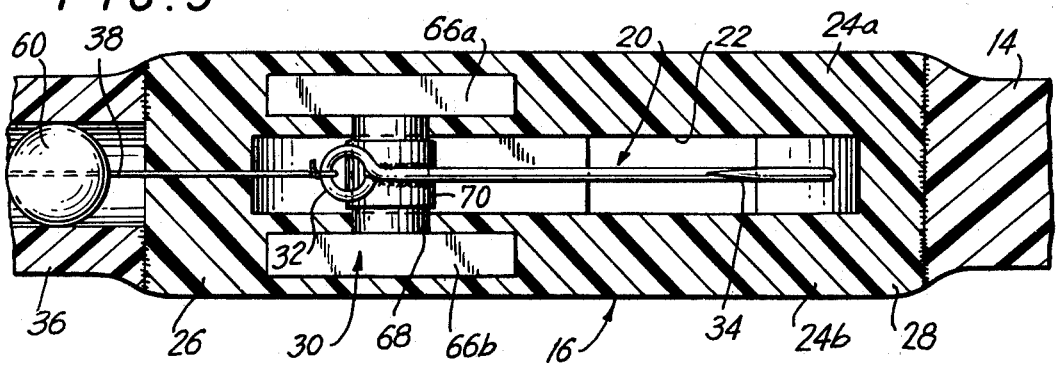
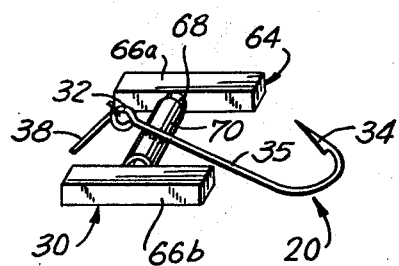
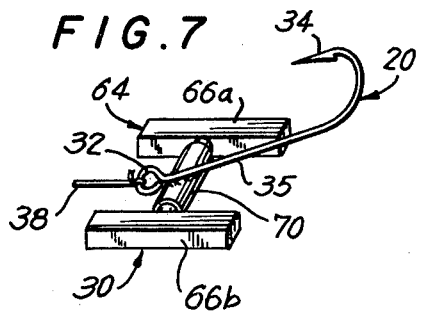
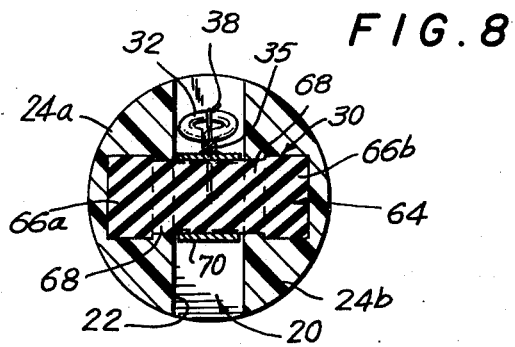
INVENTOR.
JOEL MARGULIES
BY
ATTORNEYS United States Patent Office 3,497,985
Patented Mar. 3, 1970

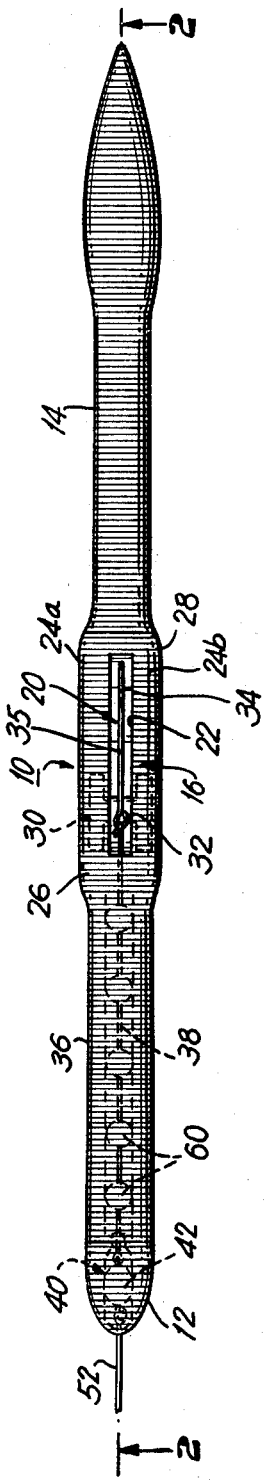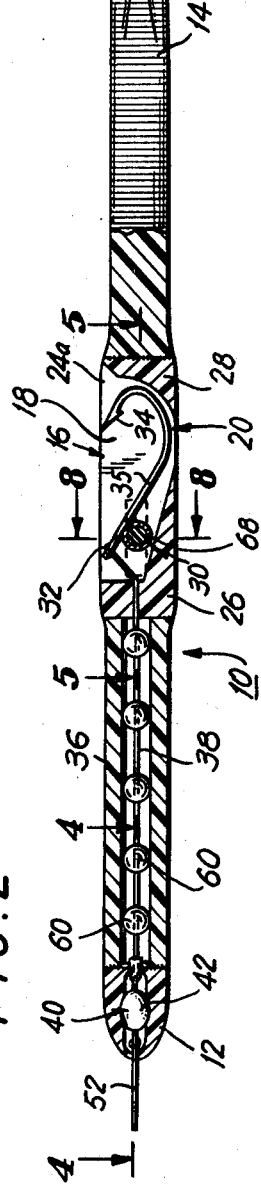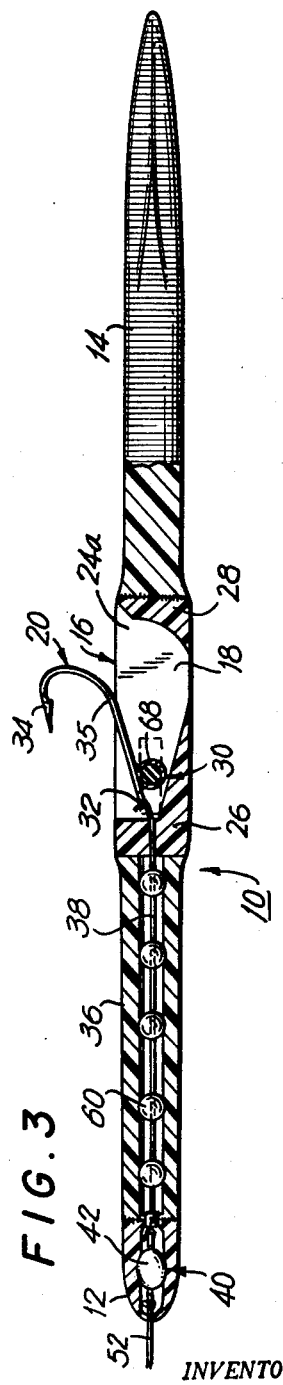

3,497,985
FISH LURES
Joel Margulies, 29—30 137th St.,
Flushing, N.Y. 11354
Filed Apr. 22, 1968, Ser. No. 723,075
Int. Cl. A01k 85/00
U.S. Cl. 43—35                                    13 Claims

ABSTRACT OF THE DISCLOSURE

A fish lure includes an elongated, flexible, worm-simulating body having a leading head region, an elongated, trailing tail region, and an intermediate housing region fixed at one end to the tail region and having a hollow interior for accommodating a hook. A yieldable elastic means is carried by the housing region and operatively connected to the hook for normally maintaining the latter in a rest position enclosed within the housing region. An elongated stretchable tubular region of the worm-simulating body extends between and is connected with the head region and the other end of the housing region, and a flexible substantially non-elastic means is connected at one end to the head region, extends along the interior of the tubular stretchable region, and at its opposite is connected to the hook for responding automatically to stretching of the tubular stretchable region of the body to displace the hook in opposition to the yieldable elastic means to the operating position where the hook projects outwardly beyond the housing region.

BACKGROUND OF THE INVENTION

The present invention relates to fish lures which form artificial bait.

Thus, the present invention relates to fish lures which have an appearance simulating that of a creature, such as a worm, which is attractive to fish.

Known lures of this general type are conventionally provided with hooks which are designed to automatically penetrate into a fish when the fish seizes the artificial bait which forms the lure. However, conventional fish lures suffer from several drawbacks. In the first place they do not faithfully simulate a creature which is attracted to fish. For example, conventional lures have projecting rigid components for fastening the lure to a fishing line, and in addition conventional lures are provided with exposed, substantially rigid components to house and form part of mechanisms for actuating the hooks. In addition to detracting from the simulation of a living creature attractive to fish, these rigid components are immediately rejected or "spit out" by a fish because of their lack of softness.

Furthermore, conventional lures of this general type have complex mechanisms for actuating the hooks. These mechanisms are either of the trigger type which are adapted to be tripped for releasing the hook to the force of a spring assembly which displaces the hook to the exterior of the lure, or the mechanisms take the form of complex, mechanical transmissions which respond to seizing of the lure by the fish in order to displace the hook to the exterior of the lure. Moreover, many conventional lures are provided with a plurality of hooks which not only increase the complexity of the structure but detract from the degree of sportsmanship involved in the use of the lure.

SUMMARY OF THE INVENTION

It is accordingly a primary object of the invention to provide a fish lure which will faithfully simulate the appearance of a living creature attractive to fish, such as a worm, beyond the extent to which such simulation has heretofore been achieved.

In particular, it is an object of the invention to provide a fish lure which has no exposed rigid components.

Also, it is an object of the invention to provide a fish lure capable of faithfully simulating the appearance of a moving creature attractive to fish, so that in the case of a worm-simulating lure, the structure is capable of carrying out life-like wiggling movements closely simulating the movements of a live worm.

Another object of the invention is to provide a fish lure which will not snag in weeds or the like.

Also, it is an object of the invention to provide a fish lure which readily lends itself to weight variations, so that the fish lure can conveniently be adapted for surface running, middle running, or deep running operation.

A further important object of the invention is to provide for a fish lure an exceedingly simple but highly effective structure for displacing a hook outwardly of the lure to a location where it can impale the fish in response to seizing of the lure by the fish.

Also, it is an object of the invention to provide a fish lure which will involve a high degree of sportsmanship in the use thereof.

In accordance with the invention, the fish lure has an elongated, flexible, worm-simulating body provided with a leading head region, a trailing elongated tail region, and an intermediate housing region, all of these regions being not only flexible but also soft, yieldable and elastic at their exterior surfaces. Since the material used for the lure is essentially resilient, the interior portions likewise have a minimum of rigid operative components. The intermediate housing region of the fish lure has a hollow interior within which a hook is accommodated, and the exterior surface of the housing region is formed with an opening which communicates with the hollow interior of the housing region. A yieldable elastic means is carried by the housing region and coacts with the hook therein for normally maintaining this hook in a retracted rest position where it is completely enclosed within the housing region. The lure includes an elongated stretchable region of tubular configuration extending between and connected to the head region and the intermediate housing region, and this stretchable region of the lure is of lesser rigidity than the head and housing regions thereof. An elongated, flexible, substantially non-stretchable means extends along the interior of the tubular stretchable region, is connected at one end to the head region, and is connected at its opposite end to the hook in the housing region for responding automatically to stretching of the stretchable region to displace the hook from its retracted rest position to an outer operating position where a barbed end of the hook projects outwardly beyond the housing region.

Other objects of the invention in part will be obvious and in part will be pointed out hereinafter.

The invention accordingly consists in the features of construction, combinations of elements and arrangements of parts which will be exemplified in the fishing lure hereinafter described.

BRIEF DESCRIPTION OF DRAWINGS

The invention is illustrated by way of example in the accompanying drawings which form part of this application and in which:

FIG. 1 is a top plan view of a lure of the invention with the hook retracted;

FIG. 2 is a longitudinal sectional elevation of the structure of FIG. 1 taken along line 2—2 of FIG. 1 in the direction of the arrows;

FIG. 3 shows the position which the parts of FIG. 2 assume when a hook is displaced to its operating position;

FIG. 4 is a fragmentary sectional plan view, taken along line 4—4 of FIG. 2, and showing, on an enlarged scale as compared to FIG. 2, exposing the interior of the swivel and illustrating the front region of the lure in greater detail than FIG. 2;

FIG. 5 is a fragmentary sectional plan view, taken along line 5—5 of FIG. 2 in the direction of the arrows, and showing, on a scale larger than that of FIG. 2, the structure which coacts with the hook;

FIG. 6 is a perspective illustration in idle position of the yieldable elastic means of the invention and the hook connected thereto;

FIG. 7 shows the position which the parts of FIG. 6 take when the hook has been displaced to its outer operating position; and FIG. 8 is a transverse sectional elevation, taken along line 8—8 of FIG. 2 in the direction of the arrows, and shoowing, on an enlarged scale as compared to FIG. 2, further details of the elastic yieldable means of the invention.

DESCRIPTION OF A PREFERRED EMBODIMENT

Referring now to FIG. 1, there is shown therein a fish lure 10 which simulates the appearance of a worm. The illustrated lure 10 simulates, for example, the appearance of a worm of the night-crawler type. The lure 10 has the construction of an elongated body which is flexible throughout its entire length and which has a leading head region 12, a trailing elongated tail region 14, and an intermediate housing region 16 which is joined at its rear end to the tail region 14. These components 12, 14 and 16 may be made of a plastic, such as polyvinyl chloride, the composition of which will give to the lure 10 a desirable softness and elastic yieldability.

The intermediate housing region 16 is provided with a hollow interior 18 which accommodates a hook 20, as indicated in FIG. 2. At its exterior surface the intermediate housing region 16 is former with an elongated opening 22 (FIG. 1) of rectangular configuration communicating with the hollow interior 18, said opening being so disposed and long enough to permit the barbed end of the hook to extend thereout. This hollow interior 18 of the housing region 16 is in the form of a space which is defined between the inner side surfaces of a pair of side wall portions 24a and 24b of the housing region 16. These side wall portions are maintained spaced from each other by portions 26 and 28 of the housing region 16 which are integral with and extend between the inner side surfaces of the wall portions 24a and 24b. In the illustrated example it will be noted that these spacer portions 26 and 28 are also spaced from each other at the interior side surface of the housing region 16 which is opposed to the elongated opening 22 thereof. However, this latter spacing is so disposed and short as to prevent the barbed end of the hook from extending therethrough.

It will be noted that when the hook 20 is in its retracted rest position, shown in FIG. 2, it is completely enclosed within the hollow interior 18 of the housing region 16 of the lure 10.

An elastic means 30, described in greater detail below, is carried by the intermediate housing region 16 and is operatively connected with the hook 20 to normally maintain the latter in the retracted rest position thereof shown in FIG. 2. The hook 20 has an eye end 32 and an opposed barbed end 34 interconnected by a shank 35, and the eye end 32 of the hook 20 is located nearer to the head region 12 than the barbed end 34.

Th fish lure 10 further includes an elongated tubular, elastic, stretchable, resilient region 36 which extends between and is joined to the head region 12 and the front end of the intermediate housing region 16. This stretchable region 36 of the lure has a lesser rigidity than the regions 12 and 16 thereof. Thus, while the tubular stretchable region 36 may be made of a plastic such as polyvinyl chloride, similar to that used for the other regions of the lure, the composition of the elongated stretchable region 36 is such as by a lesser degree of polymerization or the incorporation of additional plasticizers, that it has a softness greater than and a rigidity less than that of the regions 12 and 16, so that the softer, less rigid region 36 is readily stretchable and retractable.

An elongated flexible substantially non-stretchable means 38 extends along the interior of the tubular stretchable region 36, is connected at one end to the head region 12 and at an opposite end to the eye end 32 of the hook 20. This substantially non-stretchable flexible means 38 takes the form of a suitable filament which may, for example, be a length of braided fishing line of nylon, Dacron, or the like. The filament 38 extends through the left end of the housing region 16, as viewed in FIG. 2, into the hollow interior 18 of the housing region 16. The filament 39 is freely slidable through this left end of the housing 16, the latter simply being pierced to be formed at its left end as viewed in FIG. 2, with a bore through which the filament 38 passes with a snug fit which does not materially detract from the free slidability of the filament 38 through this end of the housing region 16. The eye end 32 of the hook is displaced radially from the aforesaid bore; if desired such displacement can be enhanced by angling the eye end of the hook upwardly.

When a fish seizes the complete lure or strikes it at any point to the left of the hook 20, as viewed in FIGS. 1–3, and in back of the head region 12 the resilient region 36 thereof will stretch, and in response to this stretching the non-stretchable flexible means 38 will displace the hook 20 (in a counterclockwise direction as viewed in FIG. 2) in opposition to the yieldable elastic means 30 to the operating position shown in FIG. 3 where the hook 20 extends through the opening 22 and has its barbed end 34 situated outwardly beyond the exterior of the housing region 16. This displacement is caused by the tension on the line 38 and the radial displacement of the eye end 32 of the hook from the bore in the left end of the housing 16.

As may be seen from FIG. 4, the head region 12 has a swivel means 40 embedded and completely housed therein. This swivel means 40 includes an outer hollow housing 42 of made of metal, for example, and having an ovoidal configuration as shown. This housing 42 of the swivel means 40 can be molded into the head region 12 so as to be connected thereto in this manner or it may be cemented thereto. At its left end, as viewed in FIG. 4, the housing 42 accommodates in its interior a freely turnable, dished metal member 44 fixed to an eye 46 which extends freely through an opening at the left end of the housing 42, so that the eye 46 is capable of free swiveling with respect to the housing 42. At its right end, as viewed in FIG. 4, the housing 42 accommodates in its interior a freely turnable, dished metal member 48 which is fixed to an inner eye member 50 which is capable of swiveling freely in an opening of the housing 42 at the right end thereof, as viewed in FIG. 4. The housing 42 is thus identically constructed at its opposite ends and cannot be mounted improperly within the head region 12.

The eye 46 serves to connect to the swivel means 42 a fishing line 52 which extends to an illustrated rod or reel, for example. The line 52 extends through an opening 54 at the front tip of the head region 12, and this head region 12 is formed with an interior longitudinal passage 56 which accommodates the ends of the housing 42 and in which the eyes 46 and 50 are capable of swivelling freely. The eye 46 may protrude from the head region 12 for easy accessibility to a fisherman or it can be concealed, as shown, which requires greater manual dexterity but results in a more realistic lure.

In much the same way the front end of the filament 38 is connected to the swivel eye 50. However, this filament 38 extends through a short sleeve 58 at the rear end of the head region 12 and is made of metal, for example, and after passing through the sleeve 58 the filament 38 is passed through the eye 50 and then again through the sleeve 58 which then is clinched, so that it is through the clinched sleeve 58 that the filament 38 is connected to the eye 50 of the swivel means 40. In this way the filament 38 is fixed at one end to the head region 12.

It will be noted that with this construction there are no exposed components which will detract from the faithfulness with which the lure simulates a worm. Moreover, the head region 12 is capable of preventing the worm-simulating structure from becoming snagged in weeds or similar obstructions and in fact clears a path for the worm through such obstructions. The bullet shaped (forwardly tapering) configuration aids in this connection. The free swiveling of the eye 46 enables the entire worm to swivel with respect to the line 52 without creating any difficulties in the manipulation thereof, such as twisting of the fishing line between the eye 46 and the fisheman's reel. The use of an external visible swivel in front of the lure is thus rendered unnecessary. Also, the swivel connection 50 between the head region 12 and the remainder of the structure enables the head region 12 to become twisted with respect to the remainder of the worm-simulating structure, as when the head region 12 is pulled through weeds or other obstructions, without causing such relative twisting of the head region 12 with respect to the stretchable region 36, for example, to pull on the cord or filament 38 so as to cause the hook 20 to be displaced outwardly. Note also that if the head region 12 snags, the filament 38 will not be tensed to project the hook.

Situated within the elongated stretchable region 36 of the lure 10 are a series of mutually spaced, hollow, air-filled beads 60 also made of a plastic such as polyvinyl chloride but having a firmness and rigidity greater than that of the sleeve 36. These beads 60 also may be directly molded within the stretchable region 36 when the latter is formed. The beads can also be formed of a foamed plastic or wood, it being essential that the beads be buoyant, i.e., lighter than water, so that they will exert an upwardly biasing force on the region 36 when the latter is in water.

Each of the beads 60 is of the spherical configuration illustrated, for example, and is provided with a central tube 62 fluid-tightly fused at its ends to the outer shell of the bead 60, with these tubes 62 each having opposed open ends, so that the filament 38 can extend freely through the tubes 62. At the same time by reason of their fluid-tight connections with the shells which form the beads 60, the tubes 62 are capable of maintaining within the beads a gas, such as air, which provides the beads with an extremely small weight.

The spacing of the beads 60 along the interior of the stretchable region 36 does not detract materially from the stretchability or flexibility thereof, since upon stretching of the tubular region 36 the beads 60 will simply become spaced further apart from each other along the substantially non-stretchable flexible filament 38. Also, these beads 60 do not materially detract from the flexibility of the region 36 since it still can bend freely through 180°, for example. Furthermore, by supporting the filament 38 in the tubes 62, the beads 60 greatly reduce the extent of frictional resistance to movement of the region 36 with respect to the filament 38, so that only an extremely small force is required to stretch the tubular region 36 with respect to the filament 38.

While the head region 12 and intermediate housing region 16 are relatively soft, elastic and yieldable, they are at the same time of sufficient rigidity, as by having a more advanced degree of polymerization or less plasticizers, to coact properly with the swivel means 40 in the case of the head region 12 and with the hook 20 and yieldable elastic means 30, in the case of the intermediate housing region 16, so that by giving to the plastic which forms the stretchable region 36 a suitable composition it can easily be made less rigid and more resilient and stretchable than the regions 12 and 16. At the same time, the effect of the hollow, air-filled beads 60 is to impart to the region 36 a buoyancy which is substantially greater than the buoyancy of the head region 12 and the intermediate housing region 16.

The head region 12 is capable of accommodating any selected one of a plurality of swivel means 40 of different sizes. These different sizes of the swivel means 40 will respectively have different weights, so that it is a simple matter to provide the head region 12 with a swivel means 40 of a given size and weight which will determine whether the lure is of the surface running, middle running, or bottom running type.

Thus, depending upon the selected weight of the swivel means 40 the lure will have a tendency to sink to a given extent, during use of the lure, and the greater specific density of the intermediate housing region 16, which carries the yieldable elastic means 30 and the hook 20, also tends to cause this intermediate housing region 16 to sink. However, because of the beads 60, the stretchable region 36 is of a lesser specific density than the regions 12 and 16 and is therefore buoyed up with a greater force causing the lure, when it is trolled at the end of a fishing line and when it is first cast into a body of water, to carry out, at the resilient stretchable flexible region 36 and tail region 14, undulatory, wiggling movements with respect to the head region 12 and housing region 16. These movements, resulting from the structure described above, provide an exceedingly life-like simulation of a moving creature which is attractive to fish. Optionally similar spaced buoyant bodies can be located in the tail region 14 and either retained in or eliminated from the region 36.

Referring now to FIGS. 5–8, the yieldable elastic means 30 of the invention includes a member 64 of H-shaped configuration having a pair of outer parallel side bars 66a and 66b. These side bars are in one piece with the opposed ends of an intermediate transverse torsion bar 68 of the yieldable elastic means 30. The side bars 66a and 66b and the integral torsion bar 68 of the H-shaped member 64 may be made, for example, of an elastomer such as a rubber which is elastically yieldable.

As is apparent from FIG. 5, in particular, the side bars 66a and 66b are directly embedded within the opposed side wall portions 24a and 24b of the intermediate housing region 16, and this connection may be brought about by molding the side bars 66a and 66b into these wall portions when the intermediate housing region 16 is molded or they may be cemented in molded recesses. Thus, the result is that the transverse torsion bar portion 68 extends perpendicularly across the hollow interior 18 of the intermediate housing region 16 and is fixed at its opposed ends to the opposed wall portions 24a and 24b of the housing region 16.

The yieldable elastic means 30 further includes a metallic connecting piece 70 wrapped at least partly around and tightly (constrictively) gripping the torsion bar 68 so as to be functionally integral therewith. In addition, this curved metallic piece 70 may be fixed to the torsion bar 60 by a suitable epoxy resin or the like, which acts as an adhesive.

The hook 20 is directly fixed to the metallic piece 70, at the region of the eye end 32 of the hook 20, as by having its shank 35 soldered or otherwise fastened to the metallic piece 70.

As is apparent particularly from FIG. 2, when the yieldable elastic means 30 retains the hook 20 in its retracted position of rest (see FIGS. 2 and 6), the eye end 32 of the hook is displaced radially from the central axis of the tubular region 36 along which the filament 38 extends. Therefore, when the housing region 16 is displaced rearwardly by a fish with respect to the head region 12 so as to stretch the tubular region 36, the flexible substantially non-stretchable means 38 responds automatically to pull the eye end 32 of the hook inwardly toward the central axis of the tubular region 36 while acting in opposition to the torsion bar 68, twisting the latter to the actuated position shown in FIGS. 3 and 7. Thus, through this exceedingly simple structure which does not include any tripping mechanisms, gears, levers, coil springs, or other complications, it is possible to displace the hook 20 to the operating position of FIG. 3 in response to stretching of the tubular region 36. Moreover, it will be noted that in the event that the hook 20 does not impale the fish it will be automatically returned to the retracted position of FIG. 2 when the tubular region 36 contracts to its initial length, the inherent elasticity of the torsion bar 68 acting at this time to return the hook 20 to its rest position while releasing tension on the filament 38 to the resilient region return the hook also to the position shown in FIG. 2.

The above-described components of the lure of the invention are very easily assembled. The swivel means 40 of selected size and weight is initially molded within the head region 12, and the filament 38 is then connected to the swivel eye 50 by way of the sleeve 58 which is clinched as described above. Then the filament 38 is strung through the several plastic beads 60 which are initially distributed along the filament 38, and the elongated resilient stretchable sleeve 36 can at this time be molded about the beads 60 and joined to the head region 12. The right free end of the filament 38 can then be passed through a suitable passage which is pierced through the left end of the housing region 16, as viewed in FIGS. 2, 3 and 5, so that the free end of the filament 38 is now accessible to be tied to the eye end 32 of the hook 20. The right end of the stretchable region 36 can now be directly fused with or cemented to the housing region 16, and of course this housing region 16 can at any time be bonded with the elongated, flexible tail region 14. The compositions of the more rigid regions 12 and 16 are such that they are substantially uninfluenced by the temperature at which the region 36 will become plasticized sufficiently to form a secure bond with the regions 12 and 16. The same of course is true of the beads 60 which are made of a plastic whose composition will not be affected by the temperature at which the sleeve 36 is molded around these beads 60.

As noted previously buoyant beads can also be inserted in the tail region 14.

It is apparent, therefore, that with the structure of the invention the simulation of a live worm is extremely faithful. Throughout its entire exterior surface the structure of the invention has a soft feel and appearance, and its action in water is extremely realistic. At the same time the mechanical action is very simple and direct and is unencumbered by any of the complications inherent in conventional lures. It thus becomes possible with the lure of the invention to catch even very wary fish in hard-fished lakes and streams.

While it is preferred to apply the invention to a structure which simulates a worm, it is of course also possible to apply the principles of the invention to other creature (food) simulating structures which form artificial bait, such as structures which simulate frogs, grasshoppers, insects, minnows and the like.

It is furthermore to be noted that the exterior outline of the worm-simulating structure is in no way affected by the elements housed within the contour of the exterior surface of the lure. The only features which might detract from a faithful simulation are the exterior opening 22 and the opposed opening of the housing region 16 between the spacer portions 26 and 28 thereof. However, in a body of water these openings simply appear as dark spots at the exterior of the lure and do not in fact detract materially from the faithfulness with which the living creature is simulated.

Furthermore, it is to be noted that the exterior surface of the lure of the invention is situated very close to the structures in the interior thereof. In other words, the structure of the invention does not require a lure which must extend to an undesirably large extent outwardly beyond the structure housed within the lure. As a result it becomes possible to construct a lure of the invention with cross-sectional dimensions which exceed the dimensions of the hook 20 and the swivel means 40 to only an exceedingly small extent, so that even in the case of a worm which has a long slender configuration, it is possible to apply the principles of the invention without any difficulty.

It is furthermore to be noted that while the structure of the invention has only one single-barbed hook, nevertheless the structure of the invention is extremely efficient as compared to lures which have double, treble and multiple hooks. This result is achieved because the angle of the jaws of the fish in relation to the plane of the hook is not critical, since the hook is not felt by the fish until the strike is hard enough to cause displacement of the hook to its outer operating location. At this latter instant the jaws of the fish are closed, and the likelihood of a secure impalement of the hook is greatly increased.

With the structure of the invention there is a substantially uninterrupted connection between the fishing line 52 and the hook 20. In fact, it is only the swivel means 40 which is interposed in the fishing line. Except for this swivel means, there is a direct connection to the eye end of the hook since the filament 38 in effect forms a continuation of the fishing line. This feature as well as the use of a single hook greatly contributes to the sportsmanship involved in the use of the lure of the invention. The substantially direct connection of the single, standard type of hook to the fishing line thus increases the sporting nature of the lure of the invention and provides for better control and freedom of action for the fish, yielding some of the pleasures of fly-rod fishing. Because of this direct control of the hook by the fisherman it is possible to fish with greater pleasure inasmuch as there is a greater "feel" of the fish and freedom of the fish itself to fight, as opposed to conventional artificial bait in various forms where plastic, metal and wood bodies are interposed between the line and the hook. Thus, with the invention it is possible to achieve the advantages and pleasures of fly fishing with spinning and bait casting equipment while using an essentially snagless artificial bait.

Of course, the use of a single hook without loaded springs is also of importance in certain states where it may not be legal to use lures which have multiple hooks or spring-loaded hooks with tripping mechanisms.

It thus will be seen that there is provided a fishing lure which achieves the several objects of the invention and which is well-adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

What is claimed is:

1. A fish lure comprising an elongated flexible worm-simulating body having a leading head region, a trailing, elongated tail region, and an intermediate housing region joined at one end to said tail region and spaced behind said head region, all of said regions being relatively soft, yieldable, and elastic, and said housing region having a hollow interior and an exterior surface formed with an elongated opening communicating with said hollow interior, a hook situated in said hollow interior of said housing region and having an eye end and an opposed barbed end, yieldable elastic means carried by said housing region and operatively connected to said hook for normally maintaining the latter in a rest position situated entirely within said housing region, said body further including an elongated, tubular, stretchable elastic region extending between and connected with said head region and said housing region, said stretchable region of said worm-simulating body being softer and less rigid than said head and housing regions thereof, and elongated substantially non-stretchable means extending along the interior of said tubular stretchable region and connected to said head region and to said eye end of said hook for responding to stretching of said stretchable region for displacing said hook in opposition to said yieldable elastic means from said rest position of said hook to an operating position where said hook extends through said opening of said housing region and has its barbed end situated outwardly beyond said housing region.

2. The combination of claim 1 and wherein a swivel means is completely enclosed within said head region for attaching a fishing line thereto.

3. The combination of claim 2 and wherein said substantially non-stretchable means is itself flexible and in the form of an elongated flexible member connected at one end of said swivel means and at its opposite end to said eye end of said hook.

4. The combination of claim 1 and wherein said substantially non-stretchable means is itself flexible and in the form of a filament.

5. The combination of claim 4 and wherein a plurality of buoyant elements are situated within and distributed along the interior of said stretchable region and are respectively formed with tubular passages through which said filament extends, said elements reducing the friction between the filament and stretchable region of said body while at the same time imparting to said stretchable region a buoyancy greater than said head and housing regions without substantially detracting from the flexibility of said stretchable region.

6. The combination of claim 4 and wherein said housing region has a pair of opposed elongated wall portions which define between themselves the hollow interior in which said hook is located, said yieldable elastic means including a torsion bar extending transversely across the space between and carried by said opposed wall portions of said housing region and a connecting piece fixed on the one hand to said torsion bar and on the other hand to the shank of said hook, said torsion bar yielding and twisting in response to tension in said filament resulting from stretching of said stretchable region of said body thus causing the hook to be turned by said filament, during stretching of said stretchable region, to said operating position.

7. The combination of claim 6 and wherein said torsion bar forms part of an H-member having a pair of opposed side portions embedded in the wall portions of said housing region, respectively.

8. The combination of claim 6 and wherein said connecting piece of said yieldable elastic means is in the form of a metal member fastened to the exterior of said torsion bar and fastened to said hook in the region of said eye end thereof, said eye end of said hook being located at a part of said housing region which is relatively close to said stretchable region of said body while said barbed end of said hook is located at a greater distance from said stretchable region than said eye end.

9. The combination of claim 8 and wherein the eye of the hook in idle position is radially displaced from the longitudinal axis of the stretchable region.

10. A fish lure comprising a relatively soft, flexible body having a leading head region and, spaced behind of a creature attractive to fish, said creature-simulating body having a leading head region and, spaced behind the latter, a housing region movable bodily toward and away from said head region, said housing region having a hollow interior and being formed at an exterior surface with an opening communicating with said hollow interior, a hook situated in said hollow interior of said housing region, yieldable elastic means within said housing region and operatively connected to said hook for normally maintaining the latter enclosed within said housing region, and substantially non-stretchable means connected and extending between said head region and said hook and responding to an increase in the distance between said head region and housing region for displacing said hook in opposition to said yieldable elastic means to an operating position where said hook projects through said opening outwardly beyond said housing region.

11. For use in a fish lure, a one-piece elastomeric member of H-shaped configuration having a pair of outer side bars adapted to be fixed to a fish lure and a transverse, elastic torsion bar extending between and fixed to said side bars and adapted to carry a hook.

12. For use in a fish lure, a flexible worm-simulating body having a leading head region, an intermediate region spaced behind said head region, and an elongated tubular region extending between and connected at its opposite ends to said head and intermediate regions, said body having a plurality of buoyant elements situated within and spaced along said tubular region, said elements imparting to the latter a buoyancy greater than that of said head and intermediate regions without substantially detracting from the flexibility of said tubular region.

13. For use in a fish lure having a hook containing cavity, a cross-bar bridging the cavity, said bar being axially resilient and fixedly carrying a barbed hook normally biased by said bar into concealment in the cavity, and means fixing the ends of the cross-bar at opposite sides of the cavity, said cross-bar being twistable under torque to force the bar of the hook out of the cavity.

References Cited

UNITED STATES PATENTS

| 2,306,181 | 12/1942 | Neumann | 43—42.1 |
| 2,636,304 | 4/1953 | Swenson | 43—42.24 |
| 2,816,391 | 12/1957 | Michael | 43—26.2 |
| 2,854,779 | 10/1958 | Jackson | 43—42.1 X |
| 2,912,784 | 11/1959 | Carlin | 43—42.24 X |
| 3,017,716 | 1/1962 | Hawks | 43—42.24 X |
| 3,120,074 | 2/1964 | Messler | 43—37 X |
| 3,221,436 | 12/1965 | Mikus | 43—42.35 X |

WARNER H. CAMPS, Primary Examiner

U.S. Cl. X.R.

43—37, 42.04